United States Patent
Danieau et al.

(10) Patent No.: US 12,412,352 B2
(45) Date of Patent: Sep. 9, 2025

(54) METHOD AND AN APPARATUS FOR GENERATING A 3D FACE COMPRISING AT LEAST ONE DEFORMED REGION

(71) Applicant: InterDigital CE Patent Holdings, SAS, Paris (FR)

(72) Inventors: Fabien Danieau, Rennes (FR); Glenn Kerbiriou, Cesson-Sevigne (FR); Quentin Avril, Betton (FR); Nicolas Olivier, Chateaubourg (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 208 days.

(21) Appl. No.: 18/025,551

(22) PCT Filed: Sep. 6, 2021

(86) PCT No.: PCT/EP2021/074498
§ 371 (c)(1),
(2) Date: Mar. 9, 2023

(87) PCT Pub. No.: WO2022/053431
PCT Pub. Date: Mar. 17, 2022

(65) Prior Publication Data
US 2023/0334805 A1      Oct. 19, 2023

(30) Foreign Application Priority Data

Sep. 10, 2020 (EP) ..................................... 20306006

(51) Int. Cl.
*G06T 19/20* (2011.01)
*G06T 7/11* (2017.01)
*G06T 7/64* (2017.01)

(52) U.S. Cl.
CPC ................ *G06T 19/20* (2013.01); *G06T 7/11* (2017.01); *G06T 7/64* (2017.01); *G06T 2200/24* (2013.01);
(Continued)

(58) Field of Classification Search
CPC ....... G06T 13/40; G06T 15/10; G06T 15/503; G06T 2210/44; G06T 2219/2021;
(Continued)

(56) References Cited

U.S. PATENT DOCUMENTS 7,483,553 B2    1/2009  Xu et al.
9,818,216 B2   11/2017  Sela et al.
(Continued)

FOREIGN PATENT DOCUMENTS

CN    112837210 A    5/2021
KR    101987748 B1   6/2019
(Continued)

OTHER PUBLICATIONS

Nonis et al., "3D Approaches and Challenges in Facial Expression Recognition Algorithms—A Literature Review", MDPI Applied Sciences 2019, 9, 3904, Department of Management and Production Engineering, Sep. 18, 2019, 33 pages.
(Continued)

*Primary Examiner* — Jin Cheng Wang
(74) *Attorney, Agent, or Firm* — Condo Roccia Koptiw LLP

(57) ABSTRACT

A method and an apparatus for generating a 3D face comprising at least one deformed region are disclosed. A curvature exaggeration face is obtained from at least one region of a first 3D face, and a proportion exaggeration deformation is obtained for said least one region of said first 3D face. The curvature exaggeration face and the proportion exaggeration
(Continued)

deformation for obtaining said at least one deformed region of said 3D face are combined.

20 Claims, 9 Drawing Sheets

(52) U.S. Cl.
CPC .............. *G06T 2207/20021* (2013.01); *G06T 2207/20096* (2013.01); *G06T 2207/20221* (2013.01); *G06T 2207/30201* (2013.01); *G06T 2210/44* (2013.01); *G06T 2219/2021* (2013.01)

(58) Field of Classification Search
CPC ... G06T 19/20; G06T 7/11; G06T 7/64; G06T 2200/24; G06T 2207/20021; G06T 2207/20096; G06T 2207/20221; G06T 2207/30201; G06T 15/02
See application file for complete search history.

(56) References Cited

U.S. PATENT DOCUMENTS

| | | | |
|---|---|---|---|
| 2014/0198106 A1* | 7/2014 | Sumner | G06T 13/40 345/473 |
| 2015/0287229 A1* | 10/2015 | Sela | G06T 13/205 345/419 |
| 2018/0033181 A1 | 2/2018 | Sela et al. | |
| 2018/0130256 A1* | 5/2018 | Wampler | G06T 19/20 |
| 2019/0272668 A1* | 9/2019 | Echevarria Vallespi | G06T 15/503 |
| 2020/0219302 A1* | 7/2020 | Tarquini | G06T 13/40 |
| 2021/0125390 A1 | 4/2021 | Cotter et al. | |
| 2021/0319532 A1* | 10/2021 | Gong | G06T 7/0002 |
| 2022/0044352 A1* | 2/2022 | Liao | G06F 18/2135 |

FOREIGN PATENT DOCUMENTS

| | | |
|---|---|---|
| WO | WO 2019098872 A1 | 5/2019 |
| WO | WO 2021099003 A1 | 5/2021 |

OTHER PUBLICATIONS

Sorkine, Olga, "Laplacian Mesh Processing", 26th Annual Conference of the European Association for Computer Graphics, Eurographics 2005—State of the Art Reports, Dublin, Ireland, Aug. 29, 2005, 18 pages.

Liu et al., "Three Dimensional Cartoon Reconstruction based on Art Rules", Institute for Electronics and Electrical Engineers (IEEE), 2010 International Conference on Image Analysis and Signal Processing, Zhejiang, China, Apr. 9, 2010, 5 pages.

Zhou et al., "3d cartoon face generation by local deformation mapping", International Journal of Computer Graphics, The Visual Computer, Springer Publications, vol. 32, Jun. 10, 2016, 11 pages.

Sela et al., "Computational caricaturization of surfaces", Elsevier Science Direct, Computer Vision and Image Understandings, vol. 141, Geometric Image Processing Lab, Technion-Israel Institute of Technology, Haifa, Israel, May 27, 2015, 17 pages.

Tseng et al., "Synthesis of Exaggerative Caricature with Inter and Intra Correlations", Computer Vision (ACCV 2007), 8th Asian Conference on Computer Vision, Tokyo, Japan, Nov. 18, 2007, 10 pages.

Zhang et al., "Landmark Detection and 3D Face Reconstruction for Caricature using a Nonlinear Parametric Model", arXivLabs, Document: ArXiv:2004.09190, Apr. 20, 2020, 12 pages.

Chen et al., "Regularity-based Caricature Synthesis", Institute of Electronics and Electrical Engineers (IEEE), 2009 International Conference on Management and Service Science, Beijing, China, Sep. 20, 2009, 5 pages.

Cao et al., "Carigans: Unpaired Photo-to-Caricature Translation", arXivLabs, Document: ArXiv:1811.00222, ACM Transactions on Graphics, vol. 37, No. 6, Article 244, Nov. 2018, 14 pages.

Blanz et al., "A Morphable Model for the Synthesis of 3D Faces", Association for Computing Machinery (ACM), ACM Digital Library, Siggraph '99: Proceedings of the 26th annual conference on Computer graphics and interactive techniques, Jul. 1999, 8 pages.

Sadimon et al., "Computer Generated Caricature: A Survey,", Institute of Electronics and Electrical Engineers (IEEE), 2010 International Conference on Cyberworlds, Singapore, Oct. 20, 2010, 8 pages.

Brennan, Susan, "Caricature Generator: The dynamic Exaggeration of Faces by Computer", Leonardo, vol. 18, Issue No. 3, 1985, 9 pages.

* cited by examiner

| Caricature K | 40 | |
|---|---|---|
| Full Proportion | 0 | |
| Eyes Proportion | 0 | |
| Nose Proportion | 0 | |
| Mouth Proportion | 0 | |
| Head Proportion | 0 | |

METHOD AND AN APPARATUS FOR GENERATING A 3D FACE COMPRISING AT LEAST ONE DEFORMED REGION

CROSS REFERENCE TO RELATED APPLICATIONS

This application is a U.S. National Stage Application under 35 U.S.C. § 371 of International Patent Application No. PCT/EP2021/074498, filed Sep. 6, 2021, which is incorporated herein by reference.

This application claims priority to European Patent Application No. 20306006.6, filed Sep. 10, 2020, which is incorporated herein by reference in its entirety.

TECHNICAL FIELD

The present embodiments generally relate to a method and an apparatus for generating caricatures of 3D scanned faces.

BACKGROUND

Digital humans are elements of an entertainment digital world. The acquisition of one's face to make a digital character can be performed thanks to portable setup or mobile device. Such 3D faces to fit a specific scenario, game or application can be stylized using 3D caricaturing. Caricature can be defined as an art form that represents human faces in exaggerated, simplified or abstract ways. Caricaturing emphasizes the features that make a person unique, and thus creates an easily identifiable visual likeness. Human faces vary in size, shape, proportions, some have remarkably placed wrinkles and some have particular expressions. There are numerous ways to caricature a person's face, depending on the artist's style and choices. Caricature can be divided in several independent parts, e.g. exaggerating the shape of the head, the expressions, emphasizing facial lines or abstracting the haircut. Caricatures are mainly used to express sarcasm and humor for political and social issues, but they are also popular in many multimedia applications, such as entertainment, advertisements, electronic games, virtual and augmented reality (e.g. nintendo 'mii' avatar).

As a simplification and abstraction process, caricatures can be a solution to avoid the Uncanny Valley: the hypothesis that our empathy response toward a virtual character increases with its human likeness, but a feeling of eeriness appears when the human likeness is only near perfect. This unwanted effect appears in several domains such as robotics and virtual characters.

Existing methods for computer assisted caricature generation show some limitations such as the lack of control and user interaction on the method. Therefore, there is a need to improve the state of the art.

SUMMARY

According to an embodiment, a method for generating a 3D face comprising at least one deformed region is provided. The method comprises obtaining a curvature exaggeration face from at least one region of a first 3D face, obtaining a proportion exaggeration deformation for said least one region of said first 3D face, and combining said curvature exaggeration face and said proportion exaggeration deformation for obtaining said at least one deformed region of said 3D face.

According to another embodiment, an apparatus for generating a 3D face comprising at least one deformed region is provided, wherein the apparatus comprises means for obtaining a curvature exaggeration face from at least one region of a first 3D face, means for obtaining a proportion exaggeration deformation for said least one region of said first 3D face, means for combining said curvature exaggeration face and said proportion exaggeration deformation for obtaining said at least one deformed region of said 3D face.

According to another embodiment, a system for generating a 3D face comprising at least one deformed region is provided which comprises an apparatus for generating a 3D face according to any one of the embodiments presented below, a first data set of 3D faces, and a second data set of 3D deformed faces.

One or more embodiments also provide a computer program comprising instructions which when executed by one or more processors cause the one or more processors to perform the method for generating a 3D face comprising at least one deformed region according to any of the embodiments described above. One or more of the present embodiments also provide a computer readable storage medium having stored thereon instructions for generating a 3D face comprising at least one deformed region according to the methods described above.

DETAILED DESCRIPTION

Figure 1:
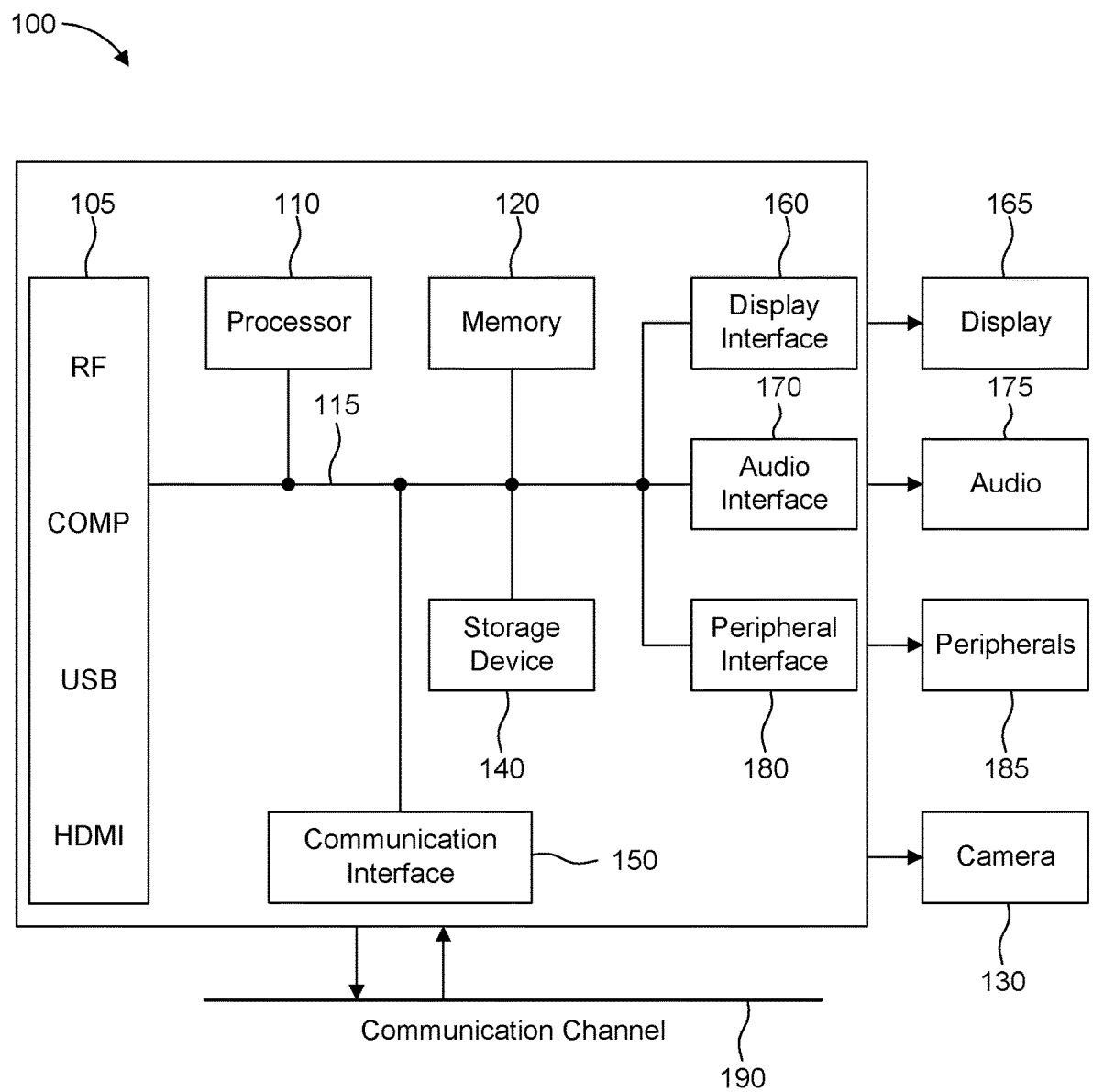
FIG. 1 illustrates a block diagram of an exemplary apparatus for generating a 3D face comprising at least one deformed region, according to an embodiment.

Computer-based methods for caricature generation can be divided in four families: rule-based methods, geometry processing methods, supervised data-driven methods and unsupervised data-driven methods.

Rule-based methods follow the rules of caricatures to generate deformed faces with emphasized features. A common rule is the "Exaggerating the Difference From the Mean" (EDFM) which consists in emphasizing the features that make a person unique, i.e different from the average face. Rule-based methods can generate a caricature from an input photograph or a 3D model, but fail at reproducing artistic styles. Different caricaturists will make different caricatures from a same person. To avoid this issue, these methods usually provide user interaction at a relatively low-level, which requires artistic knowledge/skills from the user. Therefore, with these kind of methods, a user without artistic skills cannot obtain satisfactory caricatures.

Brennan (S. E. Brennan, "*Caricature generator: The dynamic exaggeration of faces by computer,*" Leonardo, vol. 18, pp. 170-178, 1985) discloses an example of a rule-based method which proposes an implementation of EDFM in two dimensions. EDFM stands for "Exaggerating the Difference From the Mean" which consists in emphasizing the features that make a person unique i.e. different from the average face. The author built an interactive system where a user can select facial feature points which are matched against the average feature points, then the distance between them is exaggerated. In another example, Blanz and Vetter (V. Blanz and T. Vetter, "*A morphable model for the synthesis of 3d faces,*" 1999) learnt a Principal Component Analysis model over 200 3D textured faces. Their system allows caricature generation by increasing the distance to the statistical mean in terms of geometry and texture.

Geometry processing methods rely on intrinsic or extracted features of geometrical shapes. They generalize the concept of caricature beyond the domain of human faces, and they can caricature a 2D or 3D shape without any reference model. As they do not take into account any statistical information, neither the concept of artistic style, they try to link low-level geometry information to high-level caricatures concepts e.g. the fact that the most salient area should be more exaggerated. As a result, geometry processing methods fail at generating different artistic styles, in the same way rules-based methods do.

Sela et al. (M. Sela, Y. Aflalo, and R. Kimmel, "*Computational caricaturization of surfaces,*" Comput. Vis. Image Underst., vol. 141, pp. 1-17, 2015) is a geometry processing method example in which a computational approach for surface caricaturizing is introduced by locally scaling the gradient field of a mesh by its absolute Gaussian curvature. A reference mesh can be provided to follow the EDFM rule, and the authors show that their method is invariant to isometries, i.e. invariant to poses.

Supervised data-driven methods are based on paired datasets which requires the work of 2D or 3D artists. These datasets are difficult to obtain, therefore this family of techniques is not suitable for mass market applications. For instance, Zhou et al. (Zhou, X. Tong, Z. Liu, and B. Guo, "*3d cartoon face generation by local deformation mapping,*" The Visual Computer, vol. 32, pp. 717-727, 2016) regressed a set of locally linear mappings from sparse exemplars of 3D faces and their corresponding 3D caricature. More specifically, they mapped the deformation gradients of a 3D normal face between its nearest neighbors to the deformation gradients of its corresponding 3D caricature between its nearest neighbors.

Unsupervised data-driven methods learn directly from in-the-wild caricatures, mostly relying on new deep learning techniques. They use style transfer architectures to learn 3D face to 3D caricature translation and 2D photo to 3D caricature translation from unpaired datasets. By abstracting the problem, these methods reproduce a style of artists, but a user has no way to interact on the method. An example of these methods is disclosed in Cao et al. (K. Cao, J. Liao, and L. Yuan, "*Carigans: Unpaired photo-to-caricature translation,*" ACM Trans. Graph., vol. 37, pp. 244:1-244:14, 2018) in which is proposed a photo to 2D caricature translation framework CariGANs based on two Generative Adversarial Nets (GAN), namely CariGeoGAN for geometry exaggeration using landmark warping, and CariStyGAN for stylization. It has to be noted that such works also show a weakness from the use of CariStyGAN for texture stylization, because in 3D, the shading should be induced by the geometry and not by the texture. It can show inconsistencies with the shading if the 3D caricatured face is placed in new lighting conditions.

Therefore, existing computer-based methods show limitations such as the lack of control and user interaction.

According to principles presented herein, a system and a method that can both automatically caricature a 3D face and provide user control are provided.

FIG. 1 illustrates a block diagram of an example of a system in which various aspects and embodiments can be implemented. System 100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

Program code to be loaded onto processor 110 to perform the various aspects described in this application may be stored in storage device 140 and subsequently loaded onto memory 120 for execution by processor 110. In accordance with various embodiments, one or more of processor 110, memory 120, storage device 140, may store one or more of various items during the performance of the processes described in this application. Such stored items may include, but are not limited to, the input 3D face, the deformed 3D face or portions of the deformed 3D face, the 3D faces data sets, the 2D and/or 3D caricatures data set, matrices, variables, and intermediate or final results from the processing of equations, formulas, operations, and operational logic.

In several embodiments, memory inside of the processor 110 is used to store instructions and to provide working memory for processing that is needed during generating the deformed regions of the 3D face. In other embodiments, however, a memory external to the processing device (for example, the processing device may be either the processor) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal, (v) a camera 130 embedded in the system 100 or coupled to the system 100.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
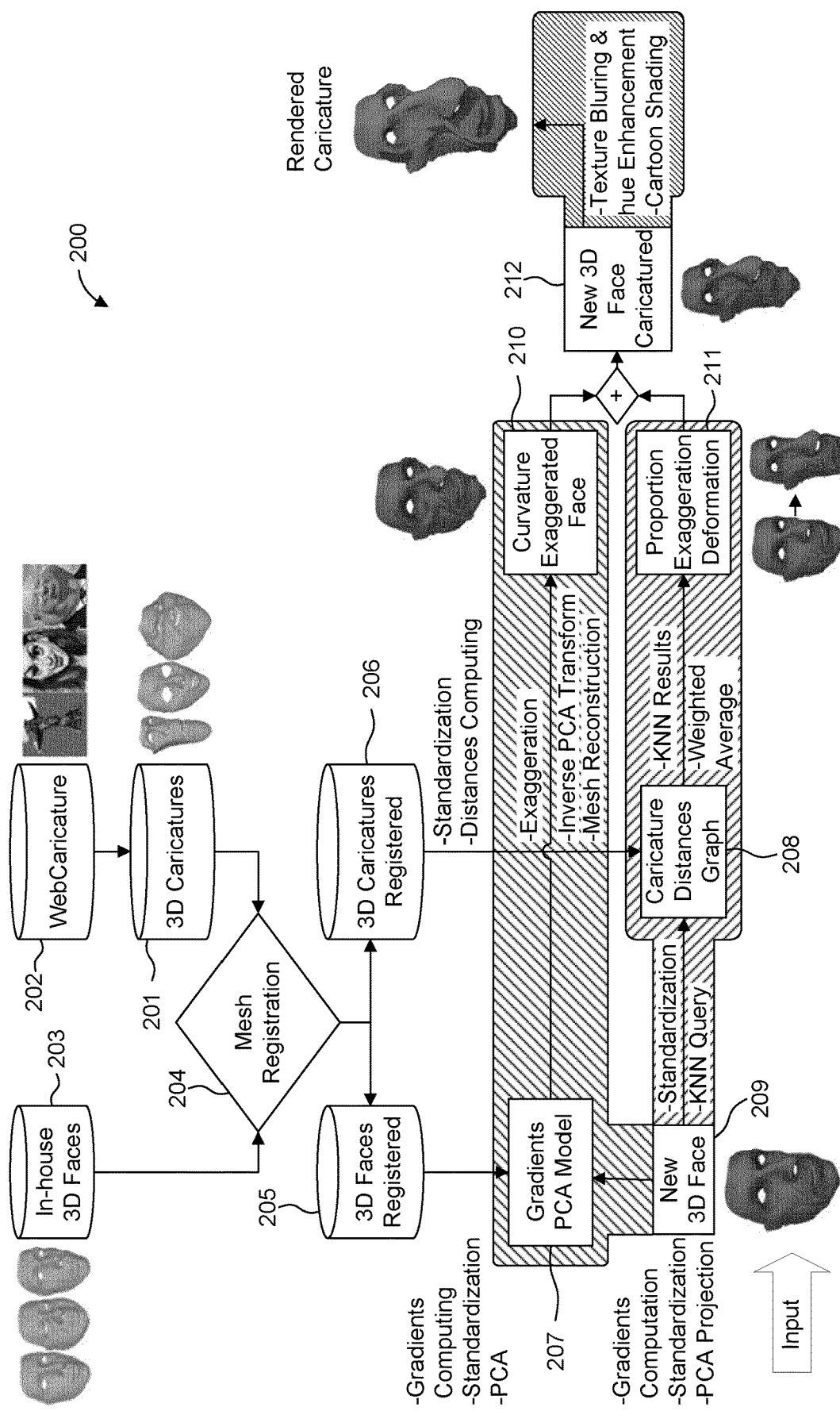
FIG. 2 illustrate an exemplary system for generating a 3D face comprising at least one deformed region, according to an embodiment.

FIG. 2 illustrate an exemplary system 200 in which various aspects and embodiments of the method for generating a 3D face comprising at least one deformed region can be implemented. In the following, the 3D face comprising at least one deformed region could also be called a caricatured 3D face.

The framework 200 comprises an offline processing and a run time caricature generation.

In the offline part, a dataset 201 of 3D caricatures (e.g. comprising over 6000 3D caricatures) is generated from an online dataset 202 of a same number of 2D caricatures, using a 2D to 3D caricature translation method, for instance the method described in J. Zhang, H. Cai, Y. Guo, and Z. Peng, "*Landmark detection and 3d face reconstruction for caricature using a nonlinear parametric model,*" ArXiv, vol. abs/2004.09190, 2020 can be used.

A dataset 203 of real face 3D scans is also used, e.g. comprising 300 3D scans of faces. These 3D faces scans may have different mesh topology from the 3D caricatures of the data set 201.

Thus, in that case, the topology of the 3D caricatures mesh is unified with the topology of the real 3D faces mesh (204) so that they present a same number of vertices and triangles. The mesh registration of two data sets 201 and 203 provides a data set of 205 of registered 3D faces and a data set 206 of registered 3D caricatures. The registered faces and caricatures are standardized with their respective mean and the standard deviation of the scanned 3D faces.

A projection representation space representative of the data set 205 of 3D faces is obtained (207) by computing the gradients of the 3D scanned faces and standardizing these gradients. A PCA (Principal Components Analysis) representation is learnt on the standardized gradients.

A nearest neighbors graph 208 is generated with the registered 3D standardized caricatures 206 with an internal scale invariant distance metric.

At runtime, a new 3D face 209 is presented to the system 200. If needed, a topology registration of the new 3D face 209 is performed.

According to an embodiment, the 3D face 209 can be segmented so that the process for generating the deformed face is applied to regions of the 3D face 209. The segmentation of the 3D face into regions shall have been performed also on the 3D faces of the first data set 205 in the offline processing, so that a projection representation space is obtained for each kind of segmented regions.

For the 3D face 209 or a region of the 3D face, the mesh gradient is computed, standardized, and projected into the PCA space 207 learnt at offline time. An EDFM algorithm is performed on the projected gradient with a natural low pass filtering, providing an exaggerated gradient. A curvature exaggerated face 210 is reconstructed from the exaggerated gradient at the least squares sense by solving a sparse linear system.

A set of standardized caricatures is retrieved by sampling the nearest neighbors graph 208 with as an input the standardized face obtained from the 3D face 209. These standardized caricatures correspond to sampled deformations. A weighted average of the sampled deformations is computed and used as a proportion exaggeration deformation 211.

The deformed face or caricatured face 212 of the 3D face 209 is obtained by combining the proportion exaggeration deformation 211 to the curvatures exaggerated face 210. According to the described example, as the 3D face and deformation are represented as 3D mesh, the combination can be an addition or a weighted addition.

The previously described processes can be performed on the whole 3D face 209 or on parts or regions of the 3D 209. When the 3D face 209 is segmented into regions, the previously described processes are performed independently on one or more of the segmented regions. An exemplary semantic face segmentation is presented below.

User interaction can be provided in the system by defining weights to apply to the processes. For instance, a user-defined weight can be defined for the strength of the gradient EDFM. In case of a segmented face, one weight for each region can be defined. A factor for the amount of sampled deformation to be added in the combination can also be user-defined. In case of a segmented face, one factor for each region can be defined. Thus, in case of a system performing on a face segmented into four regions plus the full head, the system exposes ten scalar parameters in total.

A last step of the system illustrated on FIG. 2 is a texture cartoonization performed by smoothing and enhancing the hue of the original texture of the 3D face 209.

Figure 3A:
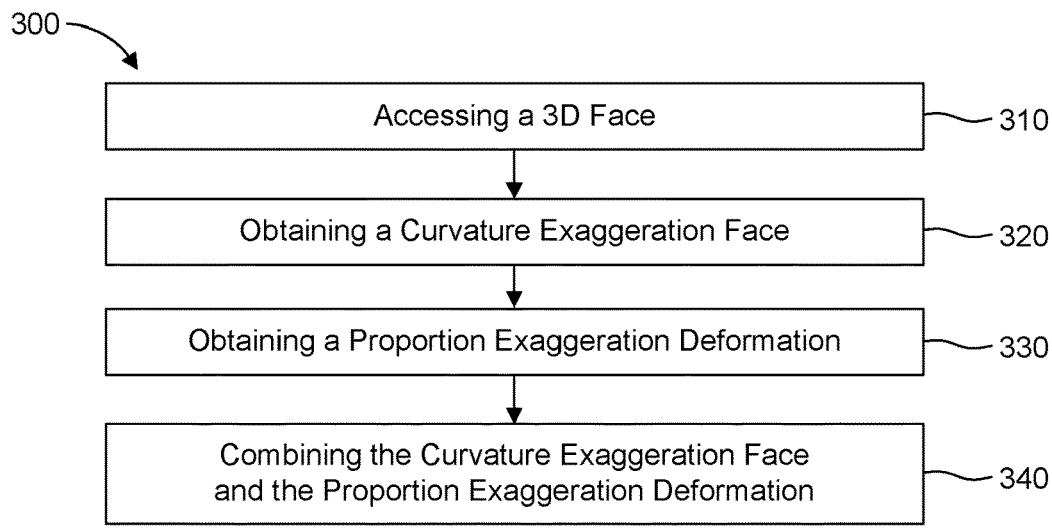
FIG. 3A illustrates a block diagram of an exemplary method for generating a 3D face comprising at least one deformed region according to an embodiment.

FIG. 3A illustrates a block diagram of an exemplary method 300 for generating a 3D face comprising at least one deformed region according to an embodiment. A 3D face is accessed 310. For instance, a real face is acquired by a camera and a 3D mesh model of the face is generated. A curvature exaggeration face is then obtained 320 for at least one region of the 3D face. In parallel, or subsequently, a proportion exaggeration deformation for said least one region of the 3D face is also obtained 330. The curvature exaggeration face and the proportion exaggeration deformation are combined 340 for obtaining the at least one deformed region of the 3D face.

Figure 3B:
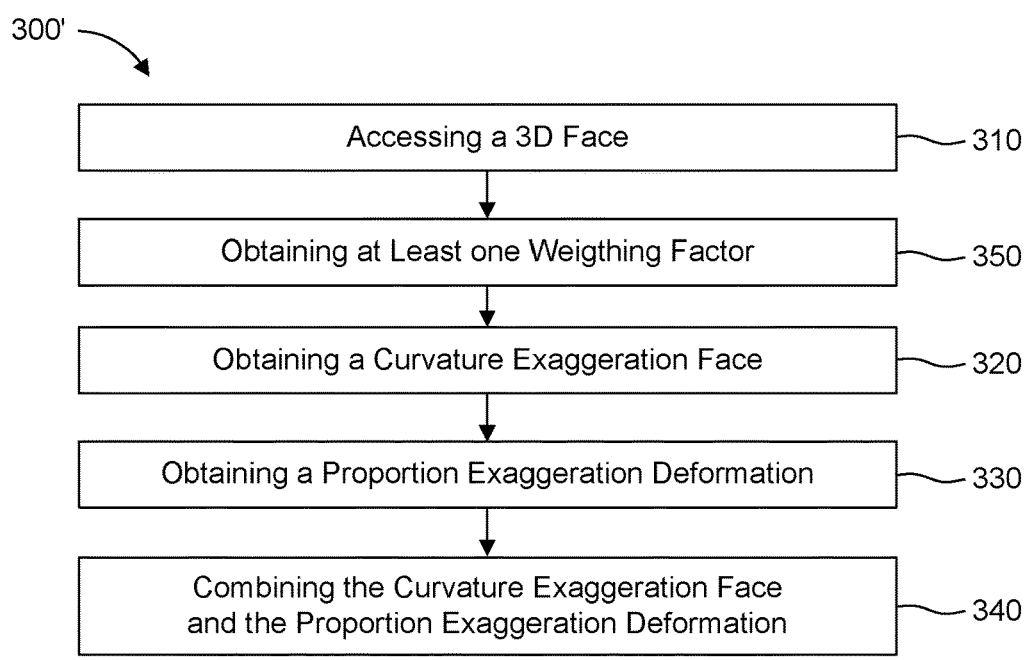
FIG. 3B illustrates a block diagram of an exemplary method for generating a 3D face comprising at least one deformed region according to another embodiment.

FIG. 3B illustrates a block diagram of an exemplary method 300' for generating a 3D face comprising at least one deformed region according to another embodiment. According to this other embodiment, an additional step 350 is added to the embodiment illustrated on FIG. 3A. In this step, at least one weighting factor is obtained by a user input, for instance using a user interface. The weighting factor can be set for the curvature exaggeration ($f_{curvatures}$) or for the proportion exaggeration ($f_{proportions}$). In some variants, a weighting factor for the curvature exaggeration ($f_{curvatures}$) and a weighting factor for the proportion exaggeration ($f_{proportions}$) can be obtained. In other variants, weighting factors by face regions can also be obtained for curvatures, proportions or both. The weighting factor for the curvature exaggeration is used at 320 for weighting the proportion exaggeration deformation. The weighting factor for the proportion exaggeration is used at 330 for weighting the proportion exaggeration deformation or at 340 when combining the curvature exaggeration face and the proportion exaggeration deformation for obtaining the at least one deformed region of the 3D face.

According to an embodiment, the 3D face comprising at least one deformed region is based on the input 3D face. In this embodiment, the curvature exaggeration face at 320 is reconstructed from the input 3D face to which an exaggeration of a difference between the input 3D face and an average of the 3D faces is apply. For instance, an average 3D face is obtained from the dataset 203 of 3D faces.

According to another embodiment, the 3D face comprising at least one deformed region is based on an average 3D face. For instance, an average 3D face is obtained from the dataset 203 of 3D faces. In this embodiment, the curvature exaggeration face at 320 is reconstructed from the average 3D face to which an exaggeration of a difference between the input 3D face and an average of the 3D faces is apply.

According to another embodiment, the 3D face comprising at least one deformed region is based on a second 3D face. In this embodiment, the curvature exaggeration face at 320 is reconstructed from the second 3D face to which an exaggeration of a difference between the input 3D face and an average of the 3D faces is apply. For instance, an average 3D face is obtained from the dataset 203 of 3D faces.

According to another embodiment, the 3D face comprising at least one deformed region is based on the input 3D face and a second 3D face. According to this embodiment, an identity reference can be transferred to the input 3D face. The curvature exaggeration face at 320 is reconstructed from the input 3D face, and the second 3D face.

Figure 4:
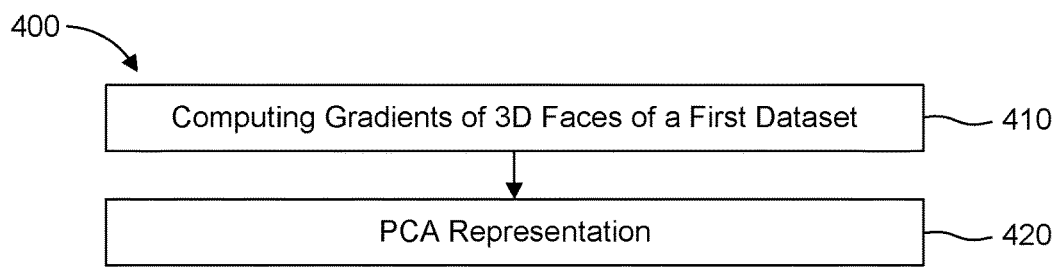
FIG. 4 illustrates a block diagram of an exemplary method for obtaining a projection representation space, according to an embodiment.

Obtaining a curvature exaggeration face is based on a projection representation space representative of a first data set (205) of 3D faces. This projection representation space is obtained during an offline process illustrated by FIG. 4. FIG. 4 illustrates a block diagram of an exemplary method 400 for obtaining a projection representation space, according to an embodiment. Exaggeration of curvatures and facial lines is a significant aspect of caricature. On images, curvatures of 3D surfaces appear with shading and depend on the lighting conditions. Naturally, the same goes for caricaturists when they make the choice to enhance the facial lines of a person. For 3D surfaces, exaggerating the curvatures corresponds to make the ridge and the rifts sharper, the pits deeper, the hills higher and the saddles more localized. According to an embodiment, the curvature exaggeration face is obtained by locally modifying the gradient of the 3D faces. To ensure preserving the proportions in the 3D faces, the position of the eyes, the nostrils, the mouth and the contour of the face are unchanged.

Motivations for the Use of the Gradient

In differential geometry, the curvature measured at a certain point is a differential quantity. Curvature refers to the eigen values of the Weingarten endomorphism which describes the local geometry at order 2. These eigen values are also known as principal curvatures, noted κ1 and κ2. Besides, the Laplace-Beltrami operator is a linear operator defined as:

$$\Delta_s(x) = \text{div}_S(\nabla_S(x)) = -(\kappa_1 + \kappa_2) \times n$$

Where S is the surface, x a point at the surface, $\text{div}_S(\cdot)$ the divergence operator, $\nabla_S(\cdot)$ the gradient operator, κ1 and κ2 the principal curvatures at the point x and n the surface normal at the point x. The previous equation illustrates a link existing between the gradient operator and the principal curvatures. It is assumed that locally exaggerating the gradient is equivalent to exaggerating the curvatures in terms of principal curvatures. $\mathbb{R}$ Gradient of Triangular Meshes The gradient operator maps functions $f: \mathbb{R}^n \to \mathbb{R}$ to vector fields $f: \mathbb{R}^n \to \mathbb{R}^n$ which are the directions of largest increase in f. In the following, the gradient g of a triangular mesh corresponds to its 3D coordinates x transformed by its gradient operator. The gradient operator of a triangular mesh can be computed using any one of the three following approaches: the vertex-based approach, the edge-based approach or the triangle-based approach. According to an embodiment, the edge-based gradient is used because it is a coordinate-free representation and it has a trivial implementation. The edge-based gradient operator of a triangular mesh has a E×V matrix form T={Ti,j} defined as:

$$T_{i,j} = \begin{cases} \dfrac{1}{|x_k - x_j|} & \text{if } e_i = (j, k) \\ \dfrac{-1}{|x_k - x_j|} & \text{if } e_i = (k, j) \\ 0 & \text{otherwise} \end{cases}$$

With $i \in 1$; $E_\mathbb{N}$, $j, k \in 1$; $V_\mathbb{N}$.

The gradient of a triangular mesh is then given by g=T·x where x are the vertex 3D positions. The matrix T is singular since the g coordinates are translation invariant, therefore $T^{-1} \cdot g$ is undefined.

To reconstruct the surface 3D coordinates x, the reconstruction error is minimized by solving a sparse linear system. Such a linear system must be constrained due to the singularity of T. Constrained versions $\tilde{T}$ and $\tilde{g}$ of T and g are computed to solve the sparse linear system at the end, for instance as in O. Sorkine "*Laplacian Mesh Processing*", in *Eurographics* 2005, *State of the Art Reports*, Y. Chrysanthou and M. Magnor, Eds, *The Eurographics Association*, 2005 for the reconstruction from the delta-coordinates:

$$\tilde{g} = \begin{bmatrix} g \\ \omega \times x_C \end{bmatrix}, \tilde{T} = \begin{bmatrix} T \\ \omega \times (I_{V \times V})_C \end{bmatrix}$$

Where C is the index set of the constrained vertices, w is a weight for the constraint term, $(I_{V \times V})_C$ are the stack of rows of the V×V identity whose index are in C. Finally, the reconstructed surface 3D points are given by:

$$\hat{x} = \min_x \|\tilde{T} \times x - \tilde{g}\|^2$$

Referring to FIG. 4, at 410, the gradient $g_i$ of each facial mesh $(x_i, v, e)$ of the 3D faces of the first data set 205 is computed, for instance following the method presented above in Gradient of Triangular Meshes. The gradients $g_i$ are standardized to follow Mo's principle:

$$g_i^{std} = \frac{g_i - \bar{g}}{\sigma_g}$$

with $\bar{g}$ being the mean of the gradients and $\sigma_g$ being the variance.

At 420, a Principal Components Analysis (PCA) representation is learnt on the standardized gradients. PCA is a statistical tool for describing datasets of high dimensions. It consists in finding the high dimensional axes that explain the most variance in the data. These axes are called principal components. The principal components are computed in such a way that they are linearly independent, so they form an orthogonal basis of the high dimensional space. The PCA representation is the projection of the data into this new basis. Since the variance is concentrated in the first coefficients, the dimensionality can be reduced by taking off the tail of the PCA representation while conserving most of the information. This technique has multiple applications including compression, denoising and data visualization. PCA is popular for real faces datasets analysis. In the context of this work, PCA is used for mesh denoising. Let the $p_i$ be the principal components of the standardized gradients $g_i^{std}$. Their PCA representation $r_i$ are obtained by:

$$\begin{bmatrix} r_i \\ \vdots \\ r_i \\ \vdots \\ r_N \end{bmatrix} = \begin{bmatrix} g_1^{std} \\ \vdots \\ g_i^{std} \\ \vdots \\ g_N^{std} \end{bmatrix} \times [\, p_1 \ \ldots \ p_j \ \ldots \ p_N\,], i,j \in 1; N_\mathbb{N}$$

With N being the number of 3D faces in the data set 205.

The projection representation space only needs to be determined once. Once the projection representation space is obtained, curvature exaggerated faces can be obtained using the projection representation space in a runtime process for any new 3D faces presented to the system.

Figure 5:
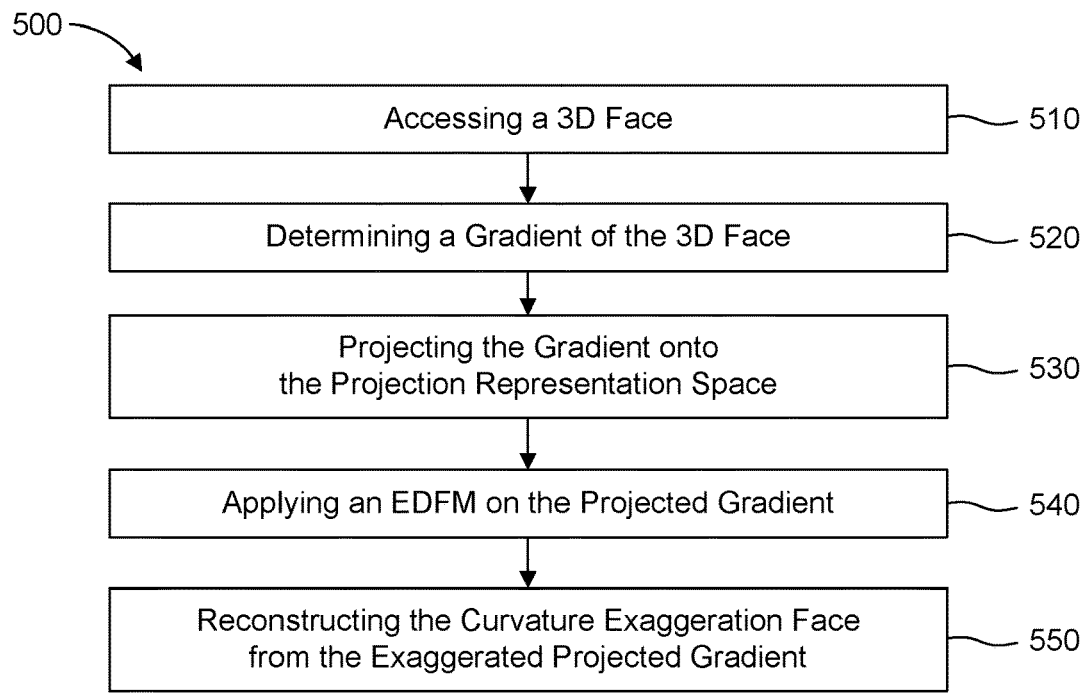
FIG. 5 illustrates a block diagram of an exemplary method for obtaining a curvature exaggeration face according to an embodiment.

FIG. 5 illustrates a block diagram of an exemplary method 500 for obtaining a curvature exaggeration face according to an embodiment. At 510, a new face mesh is presented to the system. If its topology differs from the topology of the facial meshes dataset 205, an automatic retopology is performed. At 520, the gradient g of the new 3D face is computed and standardized using the statistical information of the gradients of the 3D faces dataset 205.

$$g^{std} = \frac{g - \bar{g}}{\sigma_g}$$

At 530, the gradient is projected onto the projection representation space determined offline:

$$r = g^{std} \times [p_1 \ldots p_j \ldots p_{N-1}]$$

At 540, an EDFM technique is performed on the projected representation with a given exaggeration factor $f_{curvatures}$, which can be user-defined.

According to an embodiment, a natural low-pass filtering is applied for noise reduction. The natural low-pass filter is a weight sequence of the explained standard deviation $\sigma_{pj}$ associated to each principal component $p_j$. Since the variance is concentrated in the first coefficients, the filter has a higher response on the first values of r. To prevent the coefficients $r_i$ of r from reducing (which would be the inverse of exaggeration), the local factor cannot be less than 1. The exaggerated PCA representation $\hat{r} = \{\hat{r}_j\}$ is obtained by:

$$\hat{r}_j = r_j \times \max(f_{curvatures} \times \frac{\sigma_{pj}}{\sigma_{p1}}, 1)$$

Figure 6:
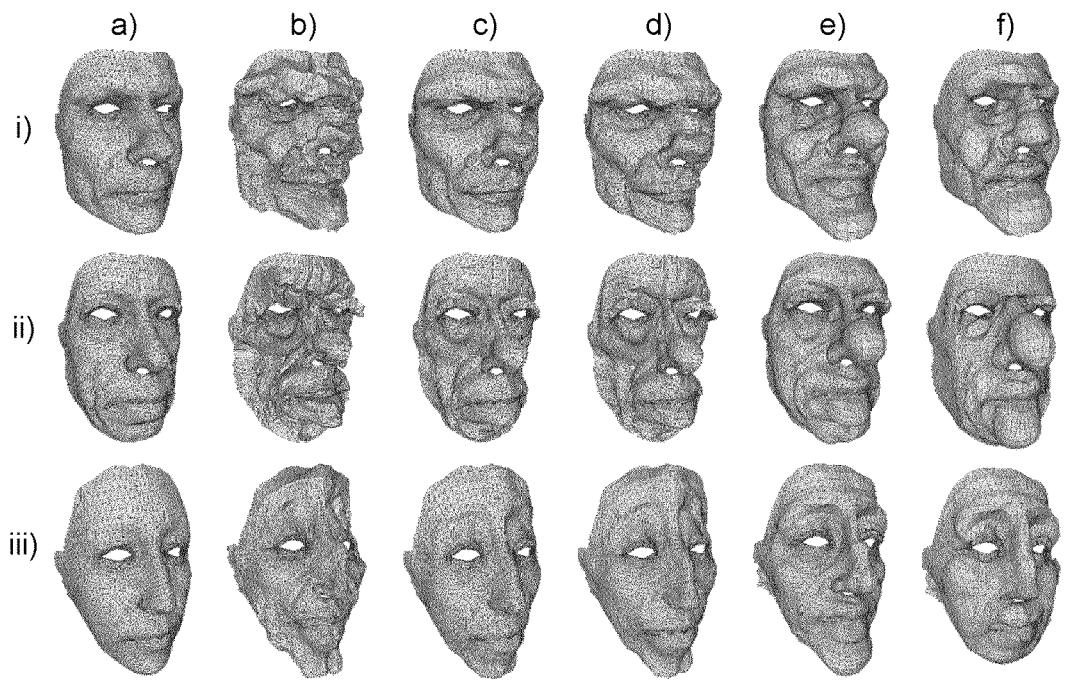
FIG. 6 illustrates results of a reconstructed curvature exaggerated face.

According to this embodiment, no parameter is needed for the low-pass filtering. FIG. 6 shows an example of efficient noise removal according to this embodiment (column b vs c).

At 550, the exaggerated standardized gradient $\widehat{g^{std}}$ is reconstructed from $\hat{r}$: $\widehat{g^{std}} = \hat{r} \times [p_1 \ldots p_j \ldots p_{N-1}]^T$ Note that since the gradient has been standardized, the empiric mean is not added. The exaggerated gradient can be recovered as follows:

$$\hat{g} = \widehat{g^{std}} \times \sigma_g + \bar{g}$$

The surface points $\hat{x}$ are recovered from the exaggerated gradient $\hat{g}$ following the reconstruction method presented above in Gradient of Triangular Meshes.

According to the embodiment presented here, the curvature exaggeration face is reconstructed based on the input 3D face. That is, the surface points $\hat{x}$ are reconstructed by minimizing the reconstruction error based on the points x of the 3D input face:

$$\hat{x} = \min_x \| \hat{T} \times x - \hat{g} \|^2$$

According to another embodiment, the curvature exaggeration face is reconstructed based on an average 3D face. That is, the surface points $\hat{x}$ are reconstructed by minimizing the reconstruction error based on the points of an average 3D face $\hat{x}$ corresponding to a mean of the 3D faces of dataset 205, x is replaced by $\bar{x}$ in the above equation.

According to another embodiment, the curvature exaggeration face is reconstructed based on a reference 3D face $x_{ref}$. This reference 3D face $x_{ref}$ is distinct from the input 3D face from which the exaggerated gradients has been obtained. According to this embodiment, the surface points $\hat{x}$ are reconstructed by minimizing the reconstruction error based on the points of the reference 3D face $x_{ref}$, x is replaced by $x_{ref}$ in the above equation.

According to another embodiment, the curvature exaggeration face is reconstructed based on the input 3D face and a reference 3D face $x_{ref}$. This reference 3D face $x_{ref}$ is distinct from the input 3D face from which the exaggerated gradients has been obtained. According to this embodiment, a gradient $g_{ref}$ of the reference 3D face is computed is used when recovering the exaggerated gradient of the input 3D face: $\hat{g} = \widehat{g^{std}} \cdot \sigma_g + g_{ref}$ FIG. 6 illustrates from i) to iii) Different facial 3D meshes of a dataset, with column a) showing the original 3D meshes, column b) illustrating a naïve gradient EDFM without segmentation and a factor fcurvatures=5, column c) showing a Gradient EDFM with PCA denoising, without segmentation and column d) showing a Gradient EDFM with PCA denoising and with segmentation (fcurvatures=5). Columns e) and f) illustrates results from a state of art method of Sela et al. without reference model ($\gamma=0.3$) (column e) and with the mean face as reference model ($\beta=4$, column f).

Figure 7:
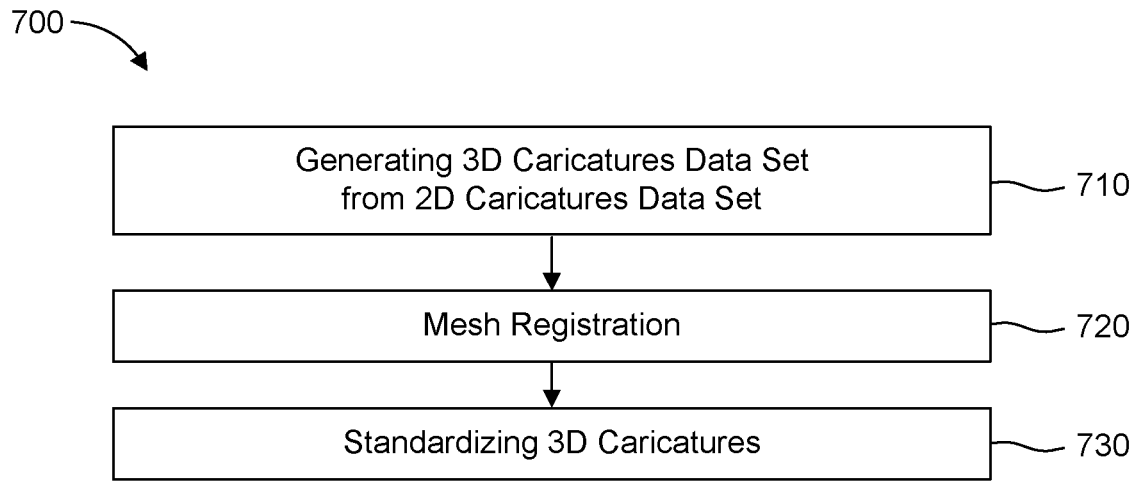
FIG. 7 illustrates a block diagram of an exemplary method for obtaining a set of relative deformations, according to an embodiment.

According to an embodiment, obtaining a proportion exaggeration deformation is based on a set of relative deformations obtained from a data set of 3D deformed faces. FIG. 7 illustrates a block diagram of an exemplary method for obtaining a set of relative deformations, according to an embodiment.

Face proportions are described as the distance ratios between key parts such as eyes to nose against nose to mouth. In this sense, face proportions are a large-scale descriptor. Since proportions are based on distance ratios, it is assumed that exaggerating the distances between the 3D points also exaggerates the proportions. Proportions are not likely to be "more normal" after exaggerating the distances. A common observation is that the caricatures are more diverse and less linear than the real faces. This superior diversity motivates the choice of taking into account the caricatures that are made by artists. Distances are exaggerated by drawing inspiration from caricatures in order to reproduce a form of artistic style and to ensure applying diverse deformations. An embodiment described here is an example-based version of EDFM.

The set of relative deformations is obtained offline. At 710, a set of 3D caricatures is generated from an 2D caricatures data set. For instance, an example of a 2D caricatures is an online WebCaricature dataset aggregating 2D caricatures done from different artists. The set of 3D caricatures obtained the 2D caricatures set can be obtained using the method proposed by Zhang et al. (J. Zhang, H. Cai, Y. Guo, and Z. Peng, "*Landmark detection and 3d face reconstruction for caricature using a nonlinear parametric model,*" ArXiv, vol. abs/2004.09190, 2020). The 3D caricatures are stored in dataset 201.

At 720, the 3D faces of the dataset 203 and the 3D caricatures of dataset 201 are registered so that they have a same topology. At 730, the 3D caricatures $y_i$ are standardized using the 3D faces' standard deviation $\sigma_x$ and the 3D faces mean $\hat{x}$ to take low-variance features into account. The standardized 3D caricatures $y_i^{std}$ are considered as relative deformations:

$$y_i^{std} = \frac{y_i - \bar{x}}{\sigma_x}$$

Figure 8:
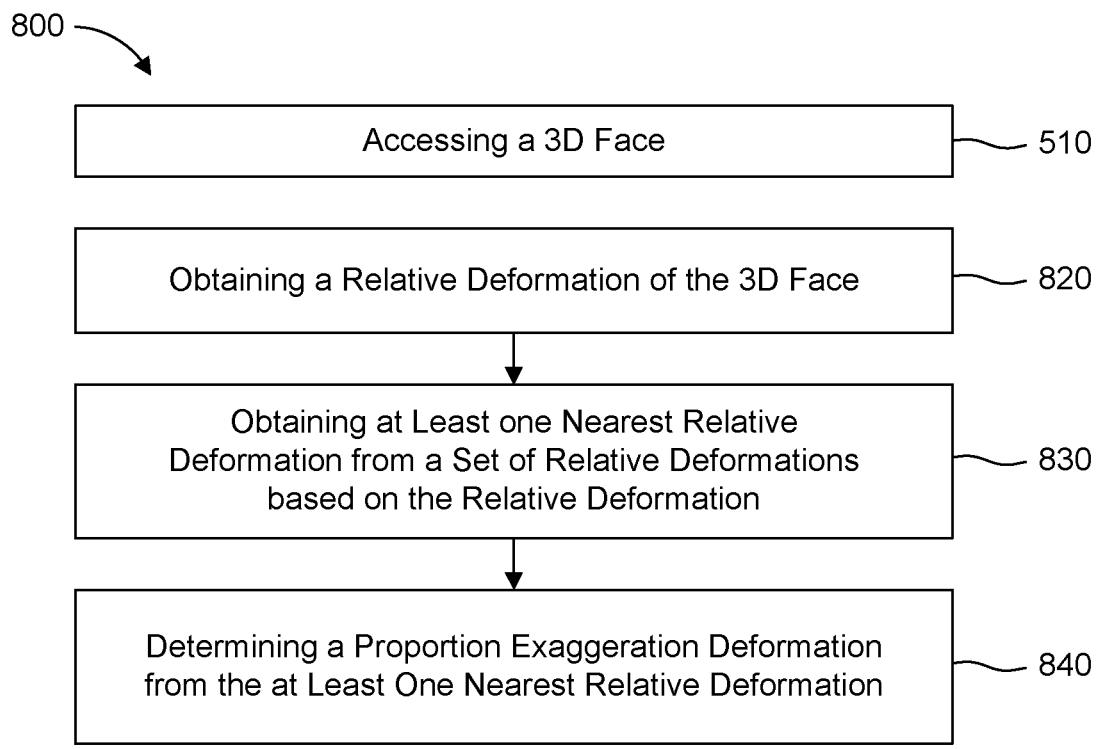
FIG. 8 illustrates a block diagram of an exemplary method for obtaining a proportion exaggeration deformation according to an embodiment.

FIG. 8 illustrates a block diagram of an exemplary method for obtaining a proportion exaggeration deformation according to an embodiment. At 510, a new 3D face is presented to the system. At 820, the new face x is standardized using the statistics of the 3D faces set 205 to obtain a relative deformation:

$$x^{std} = \frac{x - \bar{x}}{\sigma_x}$$

At 830, the relative deformation $x^{std}$ obtained is used to sample the 3D caricature domain, i.e. the set of relative deformations determined offline and its k nearest 3D caricature relative deformations $y_i^{std}$ are retrieved together with their angular distance $\theta_i = \angle(x^{std}, y_i^{std})$:

$$(\{y_i^{std}\}, \{\theta_i\}) = kNN(x^{std}), i \in [1 \ k_\mathbb{N}]$$

A kNearest Neighbors (kNN) algorithm is employed to perform dimensionality reduction. Since the retrieved standardized 3D caricatures resemble the standardized 3D face, adding them to the original 3D face is roughly equivalent to EDFM. However, this method takes into account the actual artistic styles that make these deformations. It can be seen as an example-based version of EDFM. One aspect of this technique is the use a scale invariant distance metric for the kNN algorithm. Thanks to that, the most relevant standardized 3D caricature is not the relative deformation that resembles most to the standardized 3D face, but the relative deformation that best matches the specific directions of relative deviation from the mean found in the 3D face.

At 840, a proportion exaggeration deformation is determined from the k nearest 3D caricature relative deformations. The proportion exaggeration deformation is determined as a distance weighted average $\delta$ of the relative deformations:

$$\delta = \Sigma_{i=1}^k \frac{y_i^{std}}{|y_i^{std}| \times \theta_i}$$

The relative deformations contribution should only depend on their similarity to the standardized input face, but they have different amplitude i.e. different amount of relative deformation. To counter that, the relative deformations are normalized so their amplitude is one.

When combining the curvature exaggerated face $\hat{x}$ and the proportion exaggeration deformation, the 3D vertex positions c of the caricaturized geometry of the input face can be given by $c = \hat{x} + f_{proportions} \times \delta \times \sigma_x$. Where $\hat{x}$ is the curvature exaggerated 3D face and $f_{proportions}$ is an exaggeration factor provided by a user.

Figure 9:
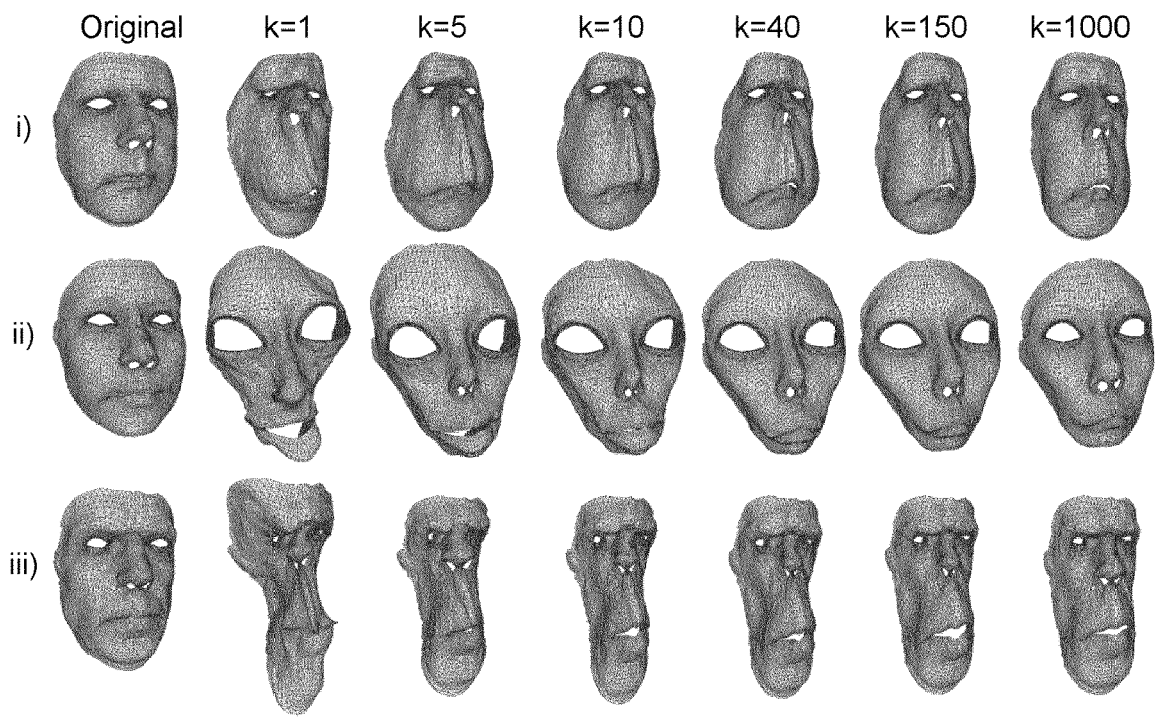
FIG. 9 illustrates results of proportion exaggeration deformation according to different embodiments.

The main parameter for the kNN approach is the number k of retrieved neighbors. FIG. 9 compares the results of generated deformed faces or caricatured faces obtained according to an embodiment, with different values of k. First column shows the original facial mesh. In the results presented in FIG. 9, caricatures have been generated with a value of $f_{proportions}=2$ and without segmentation. It can be seen that the parameter k does not have a dramatic impact on the generated caricatures. When k is small (e.g. k≤5), the method tends to introduce high frequencies. On the other hand, when k is high (e.g. k≥150), the results seem less expressive and less artistic since the styles of many artists are mixed together. A parameter k fixed to an intermediate value k=40 seems a good compromise.

Figure 10:
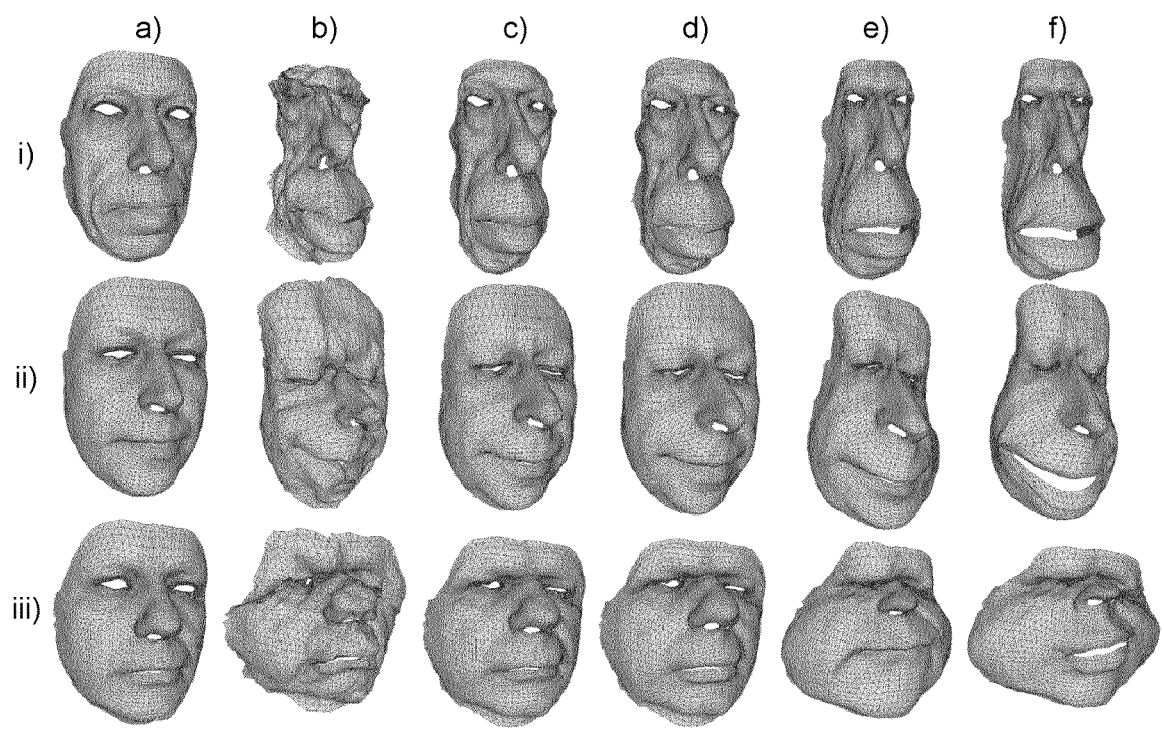
FIG. 10 illustrates a comparison between standard EDFM technique and the method for generating a deformed face according to an embodiment.

FIG. 10 illustrates a comparison between a standard EFDM technique and an embodiment of the method for generating a deformed face on different facial meshes I) to iii). Column a) shows original facial mesh, column b) shows results of a naïve EFDM performed on the 3D vertex positions. Column c) and d) show the proposed method with PCA low filtering without segmentation (c and with segmentation (d). Columns e) and f) show the kNN approach with k=40 without segmentation (e) and with segmentation (f).

The proposed embodiment can perform more large-scale deformations than standard EDFM techniques on the vertices' position, as illustrated in FIG. 10. EDFM only increases the distance to the mean in a pure computational manner, the vertices are displaced independently of their neighbors and the rest of the 3D face. In contrast, a kNN algorithm can be seen as a projection in a stylized space which contains global coherence. This global facial coherence comes from the drawing composition of artists, the whole face follows a specific caricature and drawing style. According to an embodiment, the non-linearity of the caricatures made by artists is exploiting while the EDFM rule is considered. FIG. 10 shows that the proposed embodiment allows more extreme deformations than a naïve 3D EDFM technique, and it does not introduce high frequencies even without PCA low pass filtering.

According to another embodiment, the method for generating a deformed face can be performed on one or more parts/regions of the input face resulting in one or more deformed parts/regions of the 3D face.

Figure 11:
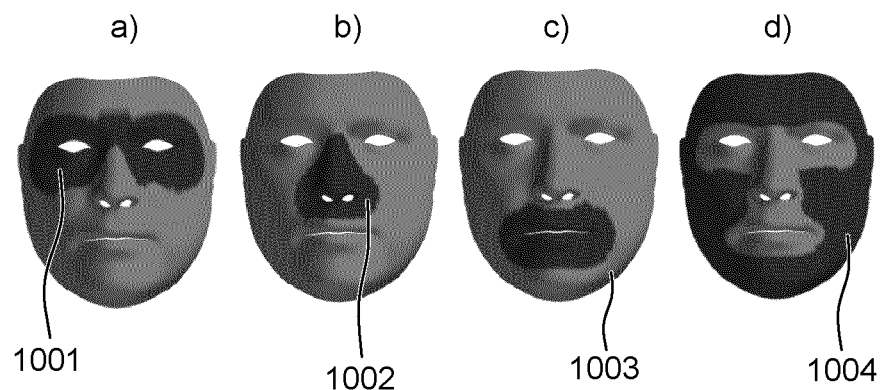
FIG. 11 shows an example of face segmentation, according to an embodiment.

In face modeling, cartoonization and caricaturing, semantic segmentation is a popular technique for increasing expressivity and user interaction. According to an embodiment, the 3D faces are segmented, for instance using a scheme proposed by Blanz and Vetter, i.e. in four regions: the eyes (1001), the nose (1002), the mouth (1003) and the rest of the face (1004), as illustrated FIG. 11. According to an embodiment, the entire face is also considered as a region. The regions are painted manually so they are complementary, i.e. their sum is the region of the entire face.

According to this embodiment, the method for generating a deformed face is applied individually on each region and merges them together. According to this variant, the 3D faces and 3D caricatures of the data sets ae also segmented and the offline methods are performed offline on the segmented regions.

Figure 12:
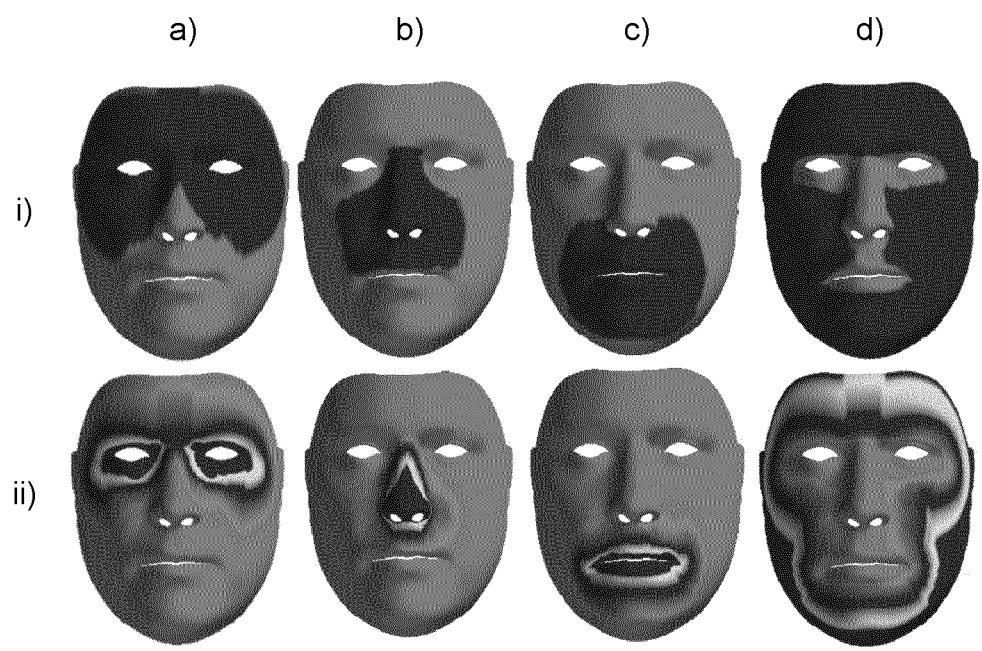
FIG. 12 shows an example of extensions of regions, according to an embodiment.

When combining the obtained deformed regions, since the masks representing the regions are not overlapping, a direct merge can create artefacts at the borders of the regions. According to a variant, the regions are extended and a smooth interpolation is performed using weight masks. FIG. 12 illustrates an example of masks extension i) and exemplary weight masks (ii). A dilation is performed according to the mesh connectivity. The weights on the extended areas are linearly decreasing with the dilation steps. Finally, they are normalized so the sum of the four weights masks is uniformly equal to one.

It is to be noted that extending the regions is not needed for curvatures exaggeration pipeline since the reconstruction process spreads the error all over the mesh. Even if the weights masks computation is straight-forward, it is sufficient for removing the artefacts visible when no interpolation is performed, i.e when using the segmentation. This semantic segmentation allows a user to choose which facial part to emphasize. It is shown that the generated 3D caricatures feature more precise deformation when using the segmented model presented above.

Application to Movies/Video Games

According to an embodiment, the 3D face comprising at least one deformed region is based on the input 3D and a reference 3D face. In this embodiment, the curvature exaggeration face at 320 is reconstructed from the input 3D face and a gradient of the reference 3D face. According to this embodiment, the method takes an additional 3D face as input, for instance a reference styled character, so the result may be used in a movie.

As described above with reference to FIG. 5, the gradient g of the input 3D face is standardized. An exaggeration is performed in the PCA space to prevent from introducing high frequencies in the reconstructed mesh. Before reconstructing the curvature exaggerated face, the gradient is first multiplied by the standard deviation of gradients and added to the mean gradient so it is no longer standardized. At this point, the mean gradient is the gradient of the mean face (since the gradient operator is linear) determined for instance from the 3D faces dataset. According to another embodiment, a gradient of a given face can also be used instead of the mean gradient. Let's denote $x_{ref}$ a 3D reference face and its gradient as $g_{ref}$, the identity transfer can be performed by adding $g_{ref}$ instead of $\bar{g}$ $$\hat{g} = \overline{g^{std}} \cdot \sigma_g + g_{ref}$$

Also, the facial mesh should be reconstructed with Vincent's border vertices' positions. The reconstructed face has then the general shape of the reference 3D face $g_{ref}$ with the identity of the input 3D face.

Figure 13:
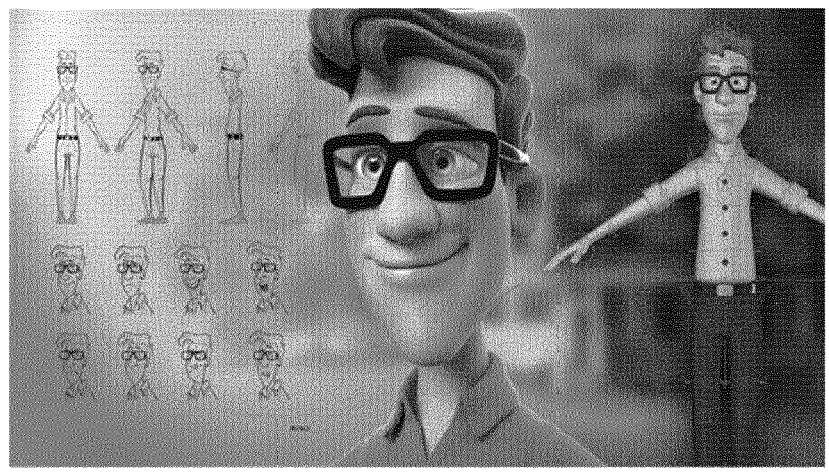
FIG. 13 shows a character Vincent designed by the Blender Foundations.
Figure 14:
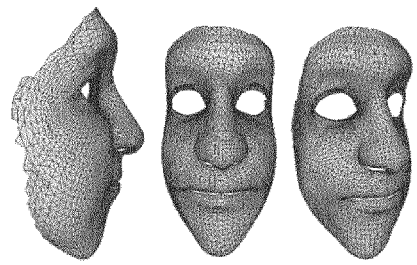
FIG. 14 shows a corresponding facial mask of the character Vincent.

For instance, FIG. 13 shows an exemplary of a reference 3D face as a character Vincent designed by the Blender Foundations. FIG. 14 shows a corresponding facial mask of the character Vincent.

Figure 15:
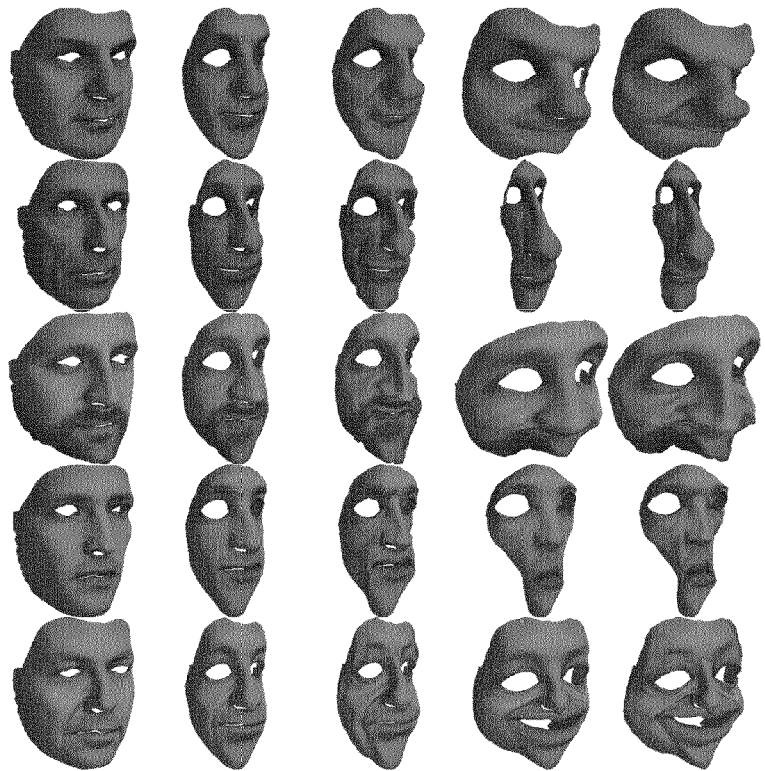
FIG. 15 shows a computed gradient of one's face transferred to the reference model, according to an embodiment.

FIG. 15 shows how the computed gradient of one's face (first column) can be transferred to the reference model (i.e. Vincent), so the face is caricatured with the reference style ($2^{nd}$ column). The second column illustrates the reconstruction of the reference 3D face to which the gradient computed on an input 3D face is applied. Exaggeration of curvatures and proportions can also be added to it (other columns).

Figures 16, 17:
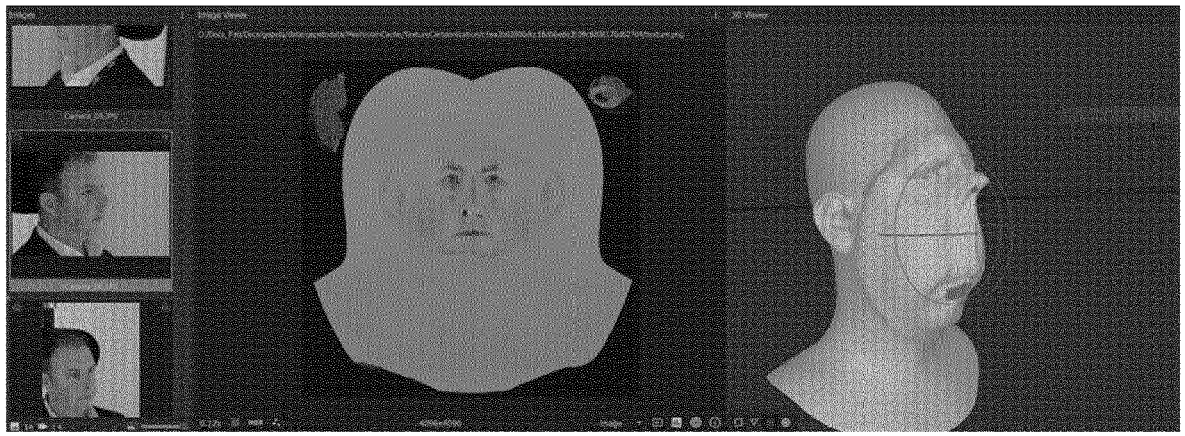
FIG. 16 illustrates an example of a part of a graphical user interface of a computer program implementing the method for generating a 3D face, according to an embodiment.
FIG. 17 illustrates an example of another part of the graphical user interface illustrated in FIG. 16.

FIGS. 16 and 17 illustrates parts of a graphical user interface of a computer program implementing the afore-mentioned method for generating a deformed 3D face, according to any one of the embodiments described above. In FIG. 16, the generated deformed 3D face can be seen on the right part of the user interface, input pictures from which the deformed 3D face is generated are shown on the left part. The texture extracted from the input pictures is shown in the middle.

FIG. 17 shows another part of the graphical user interface illustrated in FIG. 16 wherein values of different parameters used in the generation of the 3D face can be input by a user. As shown on FIG. 17, each parameter shown can be changed by moving the corresponding slider from left to right and right to left.

The parameter labelled "Caricature K" corresponds to a number of 3D caricatures that are used for determining the exaggeration proportion as in step 840 of FIG. 8. The parameter "Full proportion" corresponds to the factor applied to the obtained exaggeration proportion determined for the whole 3D face. The parameters "Eyes proportion", "Nose proportion", "Mouth proportion", "Head proportion" correspond respectively to the factors applied to the obtained exaggeration proportion determined for each part of the face (eyes, nose, mouth, head), when the method for generating a deformed 3D face is applied region by region as described with FIGS. 11 and 12.

According to the embodiment illustrated on FIGS. 16 and 17, a user can provide a weighting factor value $f_{proportions}$ for weighting the proportion exaggeration when combining the curvature and exaggeration proportions.

In another variant, similar user-input parameters are provided for allowing a user to weight the curvature exaggeration $f_{curvatures}$. The above variants can also be combined.

Various numeric values are used in the present application. The specific values are for example purposes and the aspects described are not limited to these specific values.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating a three-dimensional (3D) face comprising at least one deformed region, the method comprising:
   obtaining a curvature exaggeration face from at least one region of a first 3D face;
   obtaining a set of relative deformations from a first set of 3D caricatured faces and a second set of 3D faces, wherein the set of relative deformations are the 3D caricatured faces of the first set standardized using a standard deviation and a mean of the 3D faces of the second set;
   obtaining a first relative deformation for the at least one region of the first 3D face, wherein the first relative deformation is obtained by a standardization of the at least one region of the first 3D face using the standard deviation and the mean of the 3D faces of the second set;
   obtaining, based on the first relative deformation, at least one nearest relative deformation from the set of relative deformations;
   determining a proportion exaggeration deformation from the at least one nearest relative deformation, wherein the proportion exaggeration deformation is a weighted average deformation from the at least one nearest relative deformation, based on a distance of the at least one nearest relative deformation to the first relative deformation; and
   combining the curvature exaggeration face and the proportion exaggeration deformation for obtaining the at least one deformed region of the 3D face.

2. The method of claim 1, further comprising:
   obtaining at least one user input setting at least one weighting factor for weighting at least one of the curvature exaggeration or the proportion exaggeration deformation.

3. The method of claim 1, wherein the least one region of the first 3D face corresponds to the first 3D face.

4. The method of claim 1, wherein the first 3D face comprises a head, and wherein the head comprises at least one eye, a nose and a mouth, the method further comprising:
   segmenting the first 3D face into a set of face regions representative of at least the at least one eye, the nose, the mouth and a rest of the head of the first 3D face; and
   merging deformed region obtained for the face regions to obtain a deformed 3D face.

5. The method of claim 4, wherein the set of face regions further comprises the first 3D face.

6. The method of claim 1, further comprising accessing the first 3D face.

7. The method of claim 1, wherein the curvature exaggeration face is based on a gradient obtained from the second 3D face.

8. The method of claim 1, wherein the curvature exaggeration face is reconstructed from the least one region of the first 3D face and a second 3D face distinct from the first 3D face.

9. An apparatus for generating a three-dimensional (3D) face comprising at least one deformed region, the apparatus comprising one or more processors configured to:
   obtain a curvature exaggeration face from at least one region of a first 3D face;
   obtain a set of relative deformations from a first set of 3D caricatured faces and a second set of 3D faces, wherein the set of relative deformations are the 3D caricatured faces of the first set standardized using a standard deviation and a mean of the 3D faces of the second set;
   obtain a first relative deformation for the at least one region of the first 3D face, wherein the first relative deformation is obtained by a standardization of the at least one region of the first 3D face using the standard deviation and the mean of the 3D faces of the second set;
   obtain, based on the first relative deformation, at least one nearest relative deformation from the set of relative deformations;
   determine a proportion exaggeration deformation from the at least one nearest relative deformation, wherein the proportion exaggeration deformation is a weighted average deformation from the at least one nearest relative deformation, based on a distance of the at least one nearest relative deformation to the first relative deformation; and combine the curvature exaggeration face and the proportion exaggeration deformation for obtaining the at least one deformed region of the 3D face.

10. The apparatus of claim 9, wherein the one or more processors are further configured to access the first 3D face.

11. The apparatus of claim 9, wherein the one or more processors are further configured to obtain at least one user input setting at least one weighting factor for weighting at least one of the curvature exaggeration or the proportion exaggeration deformation.

12. The apparatus of claim 9, wherein the least one region of the first 3D face corresponds to the first 3D face.

13. The apparatus of claim 9, wherein the curvature exaggeration face is reconstructed from the least one region of the first 3D face and a second 3D face distinct from the first 3D face.

14. The apparatus of claim 9, wherein the curvature exaggeration face is based on a gradient obtained from the second 3D face.

15. A system for generating a three-dimensional (3D) face comprising at least one deformed region, the system comprising:
    an apparatus according to claim 9;
    a first data set of 3D faces; and
    a second data set of 3D deformed faces.

16. A non-transitory computer readable storage medium having stored thereon instructions for causing one or more processors to perform a method for generating a three-dimensional (3D) face comprising at least one deformed region, the method comprising:
    obtaining a curvature exaggeration face from at least one region of a first 3D face;
    obtaining a set of relative deformations from a first set of 3D caricatured faces and a second set of 3D faces, wherein the set of relative deformations are the 3D caricatured faces of the first set standardized using a standard deviation and a mean of the 3D faces of the second set;
    obtaining a first relative deformation for the at least one region of the first 3D face, wherein the first relative deformation is obtained by a standardization of the at least one region of the first 3D face using the standard deviation and the mean of the 3D faces of the second set;
    obtaining, based on the first relative deformation, at least one nearest relative deformation from the set of relative deformations;
    determining a proportion exaggeration deformation from the at least one nearest relative deformation, wherein the proportion exaggeration deformation is a weighted average deformation from the at least one nearest relative deformation, based on a distance of the at least one nearest relative deformation to the first relative deformation; and
    combining the curvature exaggeration face and the proportion exaggeration deformation for obtaining the at least one deformed region of the 3D face.

17. The non-transitory computer readable storage medium of claim 16, wherein the curvature exaggeration face is reconstructed from the least one region of the first 3D face and a second 3D face distinct from the first 3D face.

18. The non-transitory computer readable storage medium of claim 16, wherein the instructions further cause the one or more processors to perform:
    accessing the first 3D face.

19. The non-transitory computer readable storage medium of claim 16, wherein the instructions further cause the one or more processors to perform:
    obtaining at least one user input setting at least one weighting factor for weighting at least one of the curvature exaggeration or the proportion exaggeration deformation.

20. The non-transitory computer readable storage medium of claim 16, wherein the least one region of the first 3D face corresponds to the first 3D face.

* * * * *